(12) United States Patent
Roth-Johnson et al.

(10) Patent No.: US 9,739,259 B2
(45) Date of Patent: Aug. 22, 2017

(54) WIND TURBINE BLADE WITH BIPLANE SECTION

(71) Applicant: The Regents of the University of California, Oakland, CA (US)

(72) Inventors: Perry M. Roth-Johnson, Los Angeles, CA (US); Richard E. Wirz, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 548 days.

(21) Appl. No.: 14/296,304

(22) Filed: Jun. 4, 2014

(65) Prior Publication Data

US 2014/0363303 A1    Dec. 11, 2014

Related U.S. Application Data

(60) Provisional application No. 61/831,599, filed on Jun. 5, 2013.

(51) Int. Cl.
*F03D 1/06*    (2006.01)

(52) U.S. Cl.
CPC ......... *F03D 1/0633* (2013.01); *F03D 1/0675* (2013.01); *Y02E 10/721* (2013.01); *Y10T 29/49336* (2015.01)

(58) Field of Classification Search
CPC .......... F03D 1/06; F03D 1/0675; F03D 1/065; F03D 1/001; F03D 1/0683
(Continued)

(56) References Cited

U.S. PATENT DOCUMENTS

| 1,125,783 | A |   | 1/1915  | Waters |
| 4,295,790 | A | * | 10/1981 | Eggert, Jr. ............ F03D 1/0675 |
|           |   |   |         | 416/226 |

(Continued)

FOREIGN PATENT DOCUMENTS

WO     2007/105174 A1    9/2007

OTHER PUBLICATIONS

Griffith, D.T., and T.D. Ashwill, "The Sandia 100-Meter All-Glass Baseline Wind Turbine Blade: SNL100-00," Report SAND2011-3779, Sandia National Laboratories, Springfield, Va., Jun. 2011, 67 pages.

(Continued)

*Primary Examiner* — Justin Seabe
(74) *Attorney, Agent, or Firm* — Christensen O'Connor Johnson Kindness PLLC

(57) ABSTRACT

A hybrid turbine blade having a box beam assembly structure and method of designing such a hybrid turbine blade are disclosed. The box beam assembly provides the primary structure for supporting loads on the blade, and comprises oppositely positioned spar caps joined by oppositely positioned shear webs. For a portion of the blade, the box beam assembly further comprises a root buildup. In one embodiment, the shear webs comprise foam core sandwiched between two biaxial fiber-reinforced plastic laminates (FRP), the spar caps comprise uniaxial FRP laminates, and the root buildup comprises triaxial FRP laminates. The blades are designed using a novel inside-out method, wherein the box beam is first designed to support expected loads, and an aerodynamic surface is then designed to be supported by the box beam. The blade may be constructed in segments that are joined with connectors that engage the box beam structure.

12 Claims, 9 Drawing Sheets

(58) Field of Classification Search
USPC .......................................................... 416/228
See application file for complete search history.

(56) References Cited

U.S. PATENT DOCUMENTS

| | | | | |
|---|---|---|---|---|
| 5,161,952 | A * | 11/1992 | Eggers, Jr. | B64C 11/16 416/132 B |
| 7,828,246 | B2 * | 11/2010 | Ashton | B64C 3/185 244/123.9 |
| 7,922,454 | B1 * | 4/2011 | Riddell | F03D 1/001 416/224 |
| 8,079,819 | B2 * | 12/2011 | Zuteck | F03D 1/0675 416/226 |
| 8,171,633 | B2 * | 5/2012 | Zirin | F03D 1/0675 29/889.6 |
| 8,177,517 | B2 * | 5/2012 | Grabau | F03D 1/0641 416/222 |
| 8,182,231 | B2 * | 5/2012 | Corten | F03D 1/0641 416/223 R |
| 8,262,361 | B2 * | 9/2012 | Sanz Pascual | F03D 1/0675 416/226 |
| 2008/0145231 | A1 | 6/2008 | Llorente Gonzales | |
| 2009/0068018 | A1 | 3/2009 | Corten | |
| 2009/0232656 | A1 | 9/2009 | Grabau | |
| 2010/0122442 | A1 | 5/2010 | Kirkpatrick | |
| 2010/0143148 | A1 | 6/2010 | Chen | |
| 2010/0310379 | A1 | 12/2010 | Livingston | |
| 2012/0141286 | A1 | 6/2012 | Kyriakides | |
| 2012/0141287 | A1 | 6/2012 | Hynum | |
| 2013/0236327 | A1 | 9/2013 | Wirz | |

OTHER PUBLICATIONS

International Search Report and Written Opinion mailed Oct. 27, 2011, issued in corresponding International Application No. PCT/US2011/026367, filed Feb. 25, 2011, 7 pages.

* cited by examiner

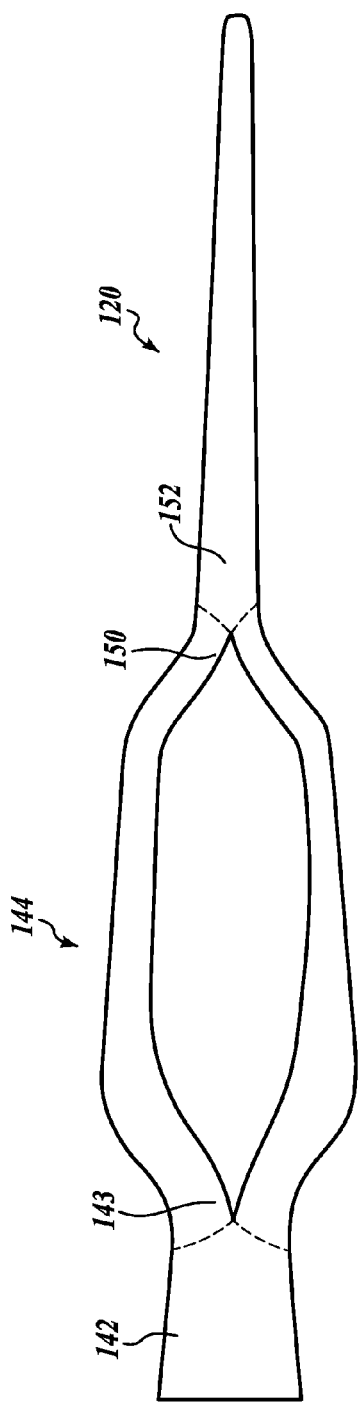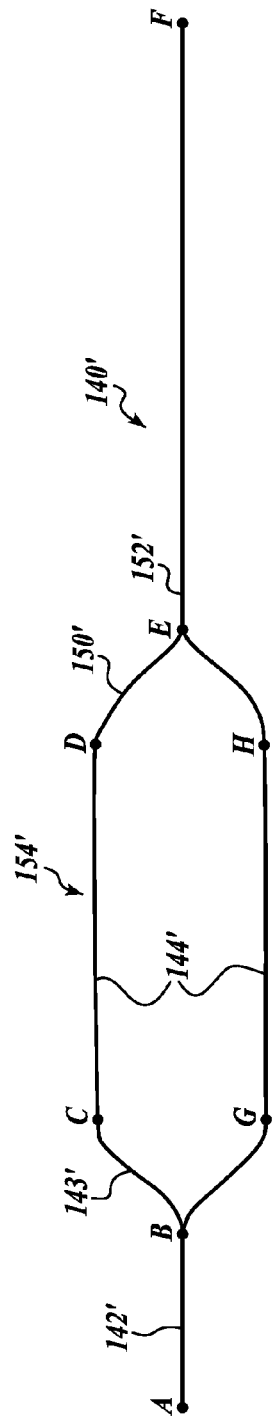
FIG. 3
FIG. 4A

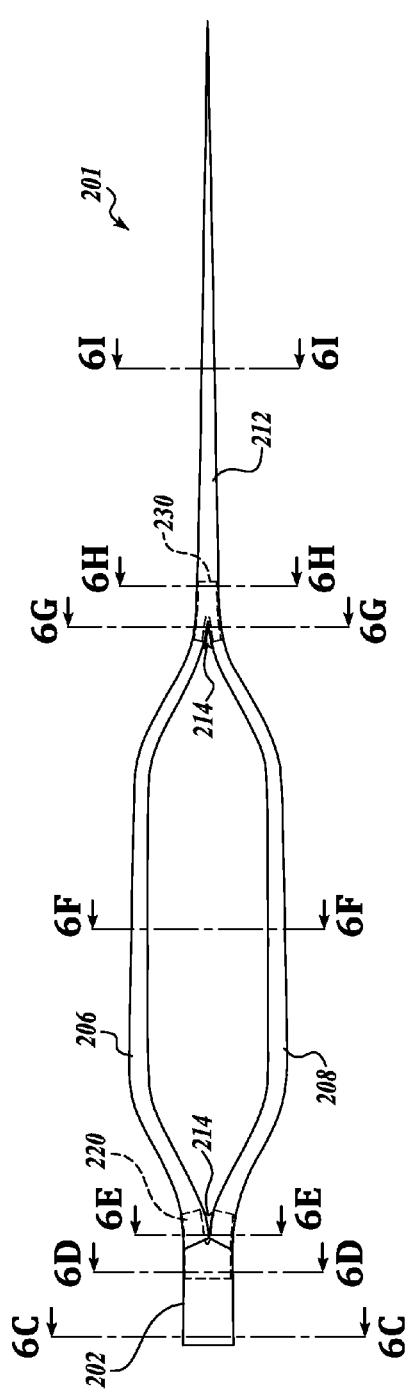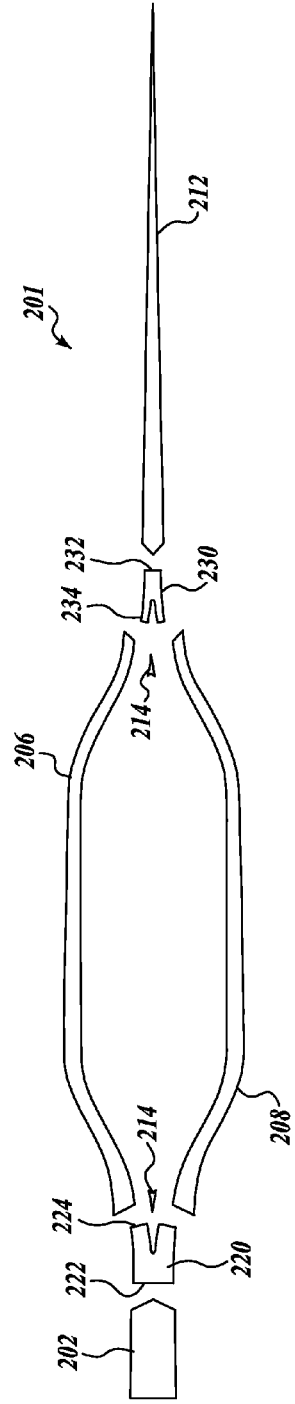
FIG. 6A
FIG. 6B

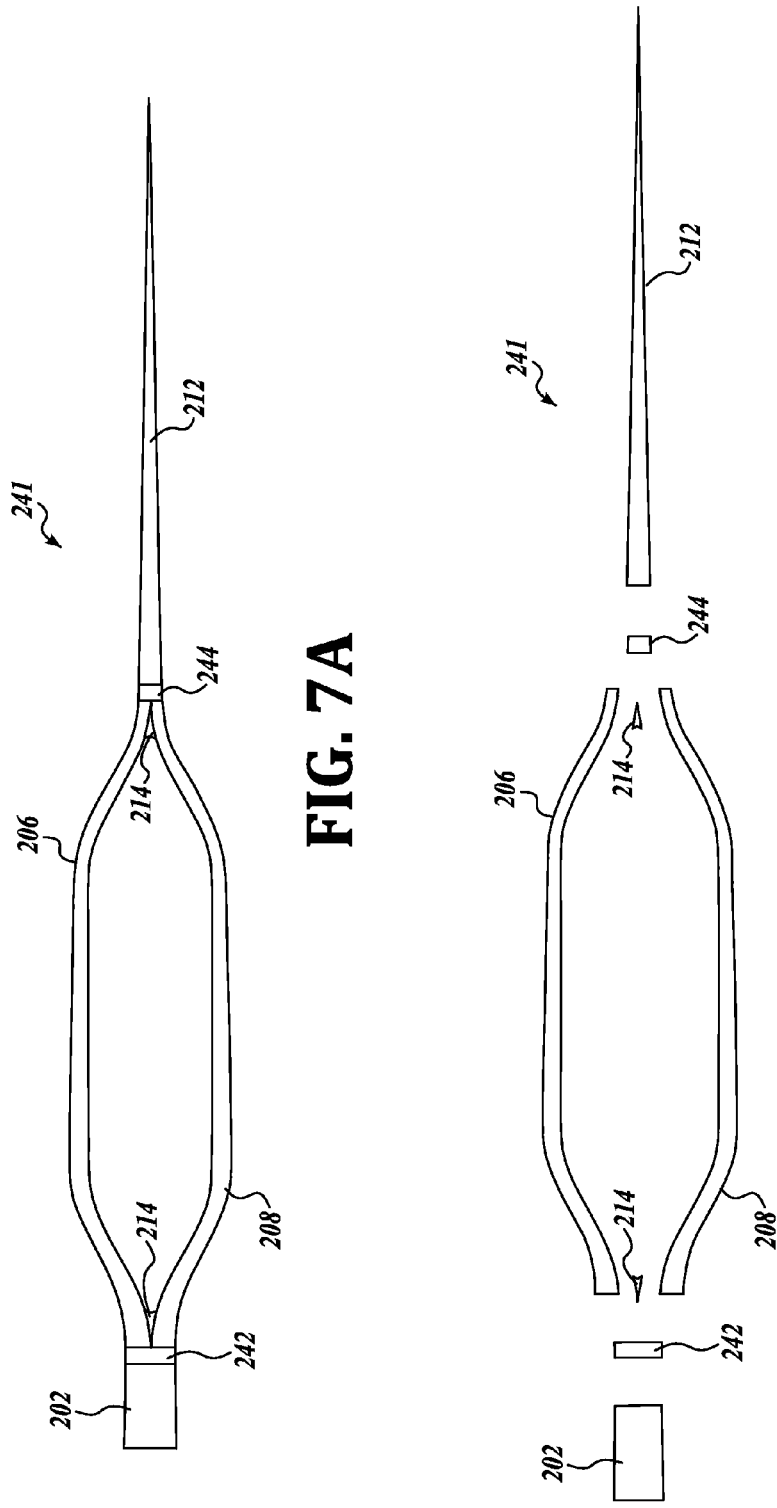

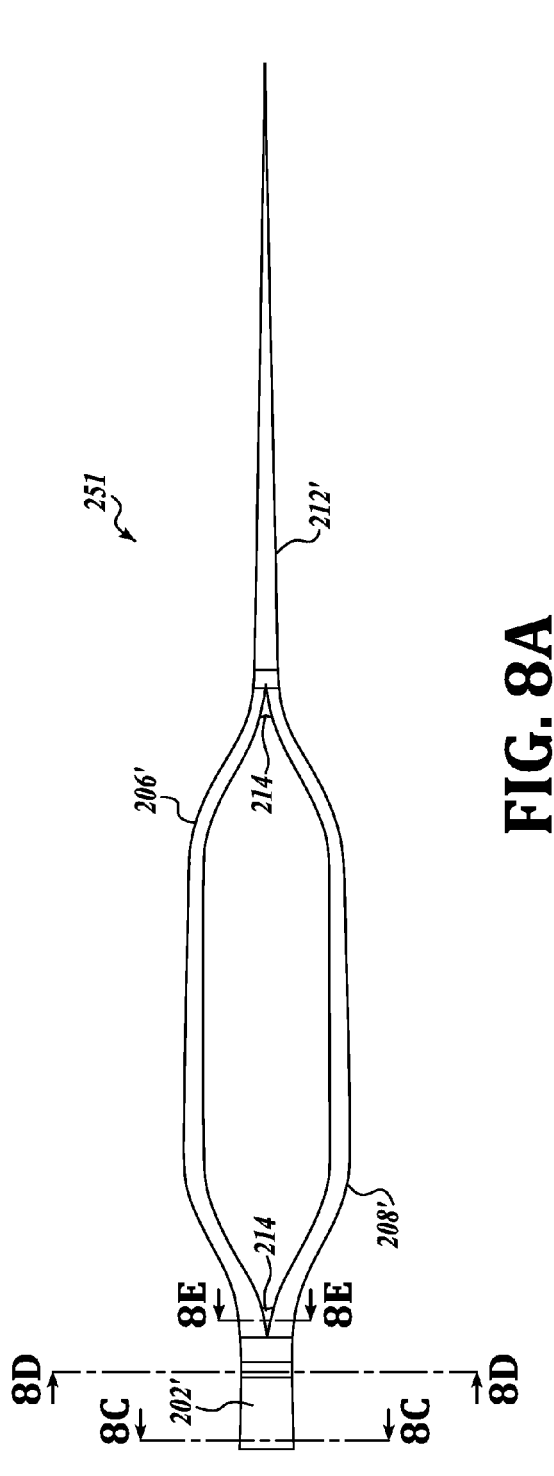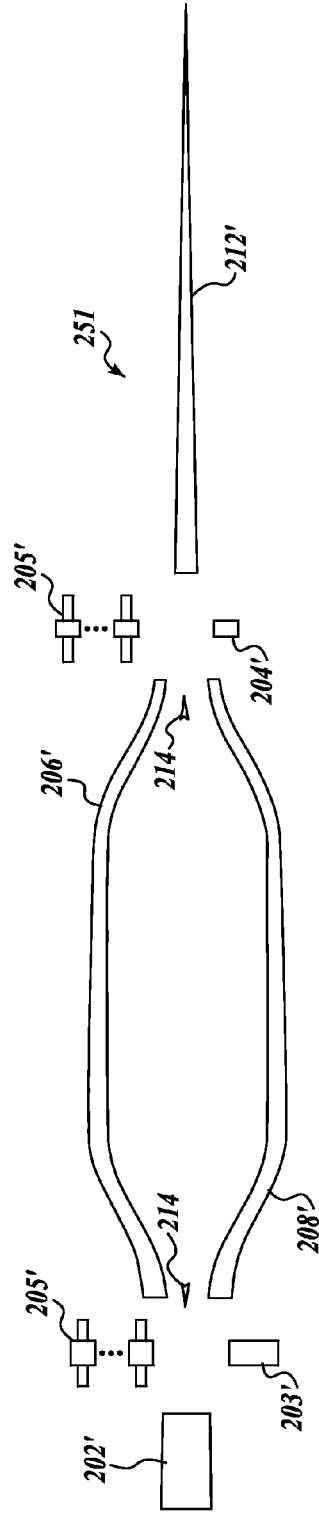
FIG. 8A
FIG. 8B

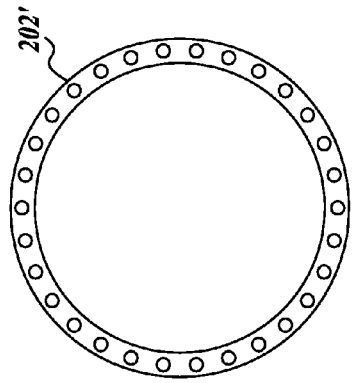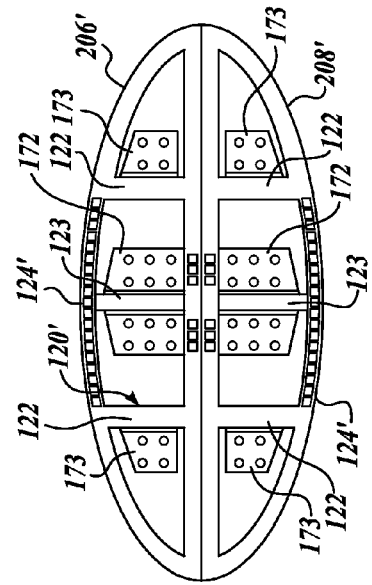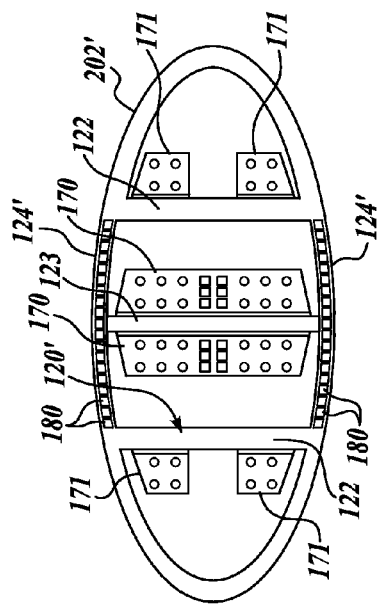
FIG. 8C
FIG. 8E
FIG. 8D

WIND TURBINE BLADE WITH BIPLANE SECTION

CROSS-REFERENCE TO RELATED APPLICATION

This application claims the benefit of Provisional Application No. 61/831599, filed Jun. 5, 2013; the entire disclosure of said application is hereby incorporated by reference.

BACKGROUND

The energy in moving air has been used for millennia, with applications ranging from sailing ships to pumping fresh water for agricultural irrigation. The first application of wind power for generating electricity has variously been attributed to Prof. James Blyth of Anderson's College in Glasgow, who in 1887 developed a 33-foot-tall wind turbine, and to Charles F. Brush who established the Brush Electric Company in 1880, and in 1888 designed and built a 60-foot-tall wind turbine.

Wind power generation capacity has grown dramatically in recent years, pursuing the twin goals of clean energy generation and energy independence. The U.S. Energy Information Administration reports that wind energy production in the U.S. increased from about 14 terawatt-hours in 2004 to about 168 terawatt-hours in 2013. Currently, wind power is the second largest source of renewable energy produced in the United States, second only to hydroelectric power.

Wind turbine design has evolved towards larger turbines to enable generating greater amounts of electrical power from each installation. Advances in blade design and materials have enabled increasingly larger wind turbine blades to capture more wind energy. In June 2011, Sandia National Laboratories issued a report on a study directed to a 100-meter wind turbine blade design, "The Sandia 100-meter All-glass Baseline Wind Turbine Blade: SNL100-00," T. D. Griffith and T. D. Ashwill, Tech. Rep., Sandia National Laboratories, Albuquerque, N. Mex. (2011), which is hereby incorporated by reference.

Modern wind turbine blades are typically constructed substantially from composite materials, e.g., fiber-reinforced plastics (FRPs). Suitable composite materials include, for example, glass or carbon fibers embedded in a resin matrix. In a conventional blade, the majority of the fibers are oriented longitudinally, along the span of the blade, so the fibers can best resist the primary bending loads on the blade during operation.

In U.S. Patent Application Publication 2013/0236327, titled "Advanced Aerodynamic and Structural Blade and Wing Design," which is hereby incorporated by reference in its entirety, one of the present inventors (Wirz) discloses a new class of blades for wind turbines that improves the structural and aerodynamic performance of the inboard region the blade. In particular, the new turbine blade includes an inboard biplane portion and an outboard monoplane portion. The pair of slender airfoils that define the biplane portion improve aerodynamic performance in the inboard region of the blade, thereby increasing the overall efficiency of the blade. In addition, the biplane airfoils are spaced apart, providing a large bending moment of inertia in the inboard region, thereby improving the blade tip deflection characteristics. Ultimately, the hybrid biplane/monoplane blade enables longer turbine blades, resulting in increased power production capabilities.

One goal of the present invention is to provide a novel construction for a hybrid turbine blade having an inboard multi-plane (e.g., biplane) portion and an outboard monoplane portion.

When designing a monoplane blade, the conventional practice is to first design an external airfoil profile based primarily on aerodynamic considerations. Then a suitable support structure is designed to fit within the blade envelope. However, this conventional method is not suited for designing hybrid multi-element turbine blades. The present application, therefore, also discloses a new "inside-out" design method for designing a hybrid blade wherein a spar structure is first designed, and then suitable airfoil profiles are fitted over the spar structure.

It is contemplated that the disclosure herein can also be applied and extended to other multi-element airfoil structures, including, for example, blades incorporating regions defining triplane or quadplane portions. The hybrid blade structures disclosed herein can also be modified for use in fluid pumps, propellers, and other similar devices.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A novel hybrid wind turbine blade having a root segment, a multi-plane segment, for example, a biplane segment, and a monoplane segment is constructed with an elongate box spar assembly that extends substantially through the wind turbine blade. The box spar assembly includes a root, an inboard joint, a multi-plane portion that in a current embodiment is a biplane, a midboard joint, and a monoplane portion. An aerodynamic external assembly is fixed to the box spar assembly. In a current embodiment, the inboard and midboard joints are Y-shaped, and connect the root to the biplane portion, and the biplane portion to the monoplane portion, respectively.

In an embodiment, the wind turbine blade includes a connector that joins the root of the box spar assembly to the biplane portion. For example, in an embodiment the connector is a Y-shaped connector with one end that engages the root of the box spar assembly, a second end that engages the upper member of the biplane portion, and a third end that engages the lower member of the biplane portion. The wind turbine blade may further include a second connector that joins the biplane portion of the box spar assembly to the monoplane portion, for example, a Y-shaped connector. In another embodiment, the root, one member of the biplane portion, and monoplane portion of the box beam assembly is formed as a single, unitary component, and first and second connectors join the other member of the biplane portion to the unitary assembly.

In an embodiment, the length of the biplane segment comprises between 40% and 60% of the length of the entire wind turbine blade.

In an embodiment, the box spar assembly comprises at least two shear webs formed from a composite material. In a particular example, each shear web comprises two biaxial fiber-reinforced polymer laminates with a foam core. The box spar assembly may further comprise two composite material spar caps that, in a particular example, are formed from uniaxial fiber-reinforced plastic. The box spar assembly may further comprise a root buildup formed from a composite material, for example, a triaxial fiber-reinforced plastic laminate.

In another embodiment, the biplane portion of the box spar assembly is joined to the root with a first plate connector, and is joined to the monoplane portion with a second plate connector.

In yet another embodiment the root and the biplane portion of the box spar assembly each comprises three shear webs, and are formed with channel members embedded in the spar caps. The root and biplane portions are joined with a channel connector that engages the embedded channels. In an embodiment, connector flanges or plates are fixed to the shear webs of the root and biplane portions of the box spar assembly, and abutting plates are joined with bolts, rivets, or other means to fix the root to the biplane portion.

A method of designing hybrid wind turbine blades having a box beam assembly includes (i) designing a reference diagram that includes a root portion, an inboard root portion, a multi-plane portion (for example, a biplane portion), a midboard root portion, and a monoplane portion; (ii) identifying spar stations along the reference diagram, and at each spar station designing a two-dimensional box beam geometry; (iii) interpolating between the two-dimensional geometries to define a three-dimensional box beam geometry; and (iv) designing an aerodynamic shell to be fixed to the box beam geometry.

In an embodiment, the two-dimensional box beam geometry definitions include the thickness and length of two shear webs and two spar caps, as well as an optional root buildup. The definitions may further include specification of the rotational position of the two-dimensional geometries.

A method of designing a hybrid biplane/monoplane wind turbine blade comprises: (1) designing a reference diagram for a spar, wherein the reference diagram includes (i) a root portion defining a one-dimensional line, (ii) a biplane portion defining two one-dimensional lines that extend together from an end of the root portion, separate, and rejoin at a second end; and (iii) a monoplane portion defining a one-dimensional line that extends from the second end; (2) defining a plurality of spar stations at spaced apart locations along the reference diagram; (3) defining a two-dimensional box beam structure for one or both of the one-dimensional lines at each of the spar stations; (4) calculating a three-dimensional box beam structure having a root segment, a biplane segment, and a monoplane segment by using the two-dimensional box beam structures; and (5) designing a three-dimensional airfoil surface for the hybrid biplane/monoplane wind turbine blade that encloses and is structurally supported by the three-dimensional box beam structure.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 illustrates an exemplary box beam spar assembly for the hybrid wind turbine blade shown in FIG. 1;

FIG. 4A is a one-dimensional reference diagram suitable for designing the spar structure shown in FIG. 3;

FIG. 6A illustrates a hybrid wind turbine blade incorporating a box beam spar assembly such as that shown in FIG. 3;

FIG. 6B is an exploded view of the hybrid wind turbine blade shown in FIG. 6A;

FIG. 7A illustrates a second hybrid wind turbine blade in accordance with the present invention;

FIG. 7B is an exploded view of the hybrid wind turbine blade shown in FIG. 7A;

FIG. 8A illustrates a third hybrid wind turbine blade in accordance with the present invention;

FIG. 8B is an exploded view of the hybrid wind turbine blade shown in FIG. 8A; and FIGS. 8C-8E show cross-sections of the hybrid wind turbine blade shown in FIG. 8A.

DETAILED DESCRIPTION

Figure 1:
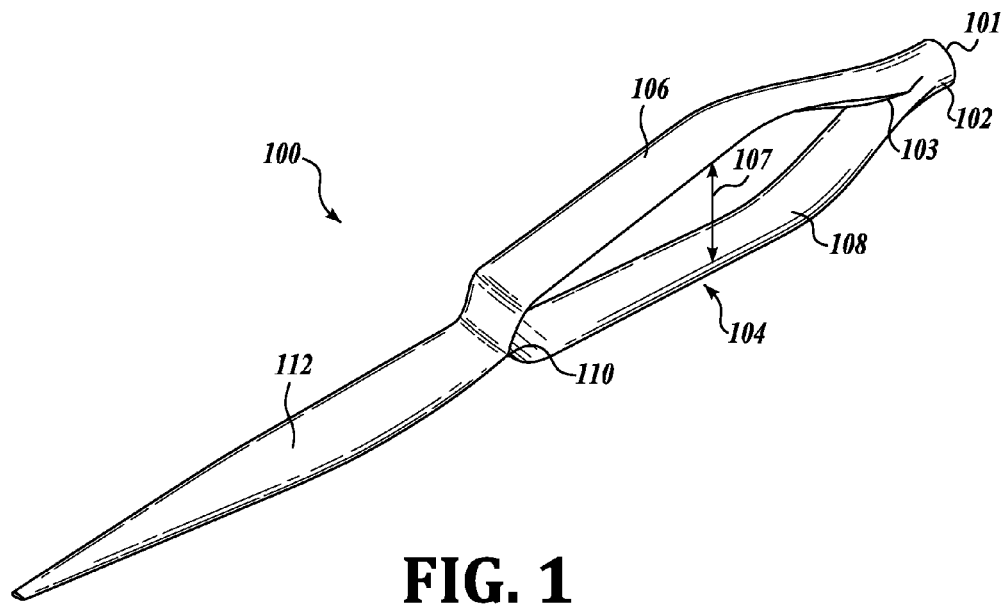
FIG. 1 illustrates a hybrid wind turbine blade in accordance with the present invention, wherein the hybrid blade includes an inboard biplane portion and an outboard monoplane portion.

A novel multi-element blade, including an internal structure for the multi-element blade, is disclosed. In an exemplary embodiment, the multi-element blade is a hybrid biplane/monoplane wind turbine blade 100, as illustrated in FIG. 1. The hybrid turbine blade 100 includes a root portion 102 that is configured to engage a wind turbine hub (not shown). For example, the root portion 102 may be cylindrical at its proximal end 101, and smoothly transition to a more aerodynamic cross section at its distal end. The hybrid turbine blade 100 further includes a biplane portion 104 comprising an upper airfoil section 106 and a lower airfoil section 108, with a gap 107 therebetween. The biplane portion 104 extends from a Y-shaped first joint 103 at the proximal end that engages the root portion 102 and a Y-shaped second joint 110. A monoplane portion 112 extends distally from the second joint 110. The hybrid turbine blade 100 therefore includes an inboard root portion 102, an intermediate biplane portion 104, and an outboard monoplane portion 112.

Figure 2:
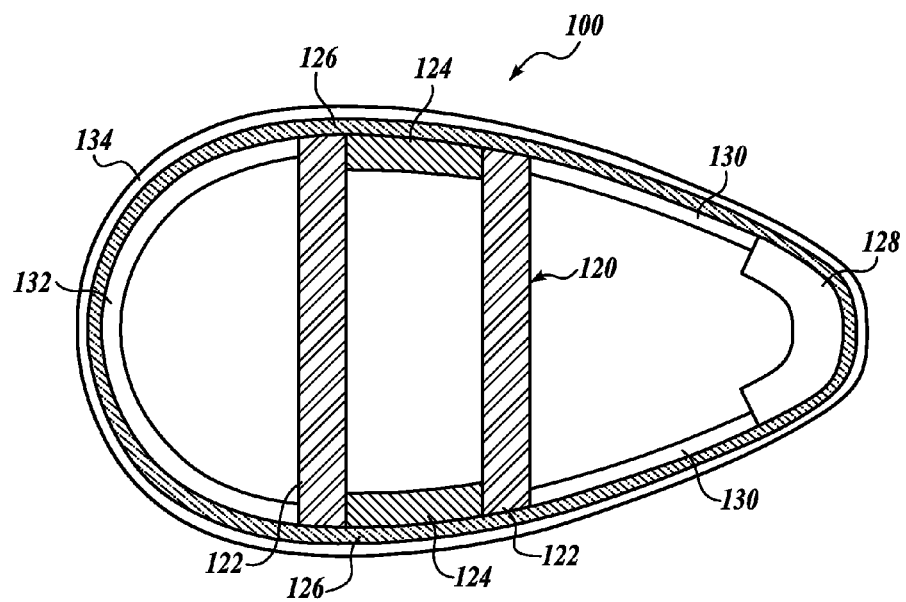
FIG. 2 schematically illustrates an exemplary airfoil cross section in accordance with the present invention.

FIG. 2 illustrates schematically a representative cross-section of the hybrid turbine blade 100, taken along the blade root portion 102 near the first joint 103. The cross-section is not drawn to scale. The root portion 102 includes a closed box beam spar assembly 120 that is the primary load-bearing structure of the blade 100. The box beam spar assembly 120 is defined by two shear webs 122 joined at either end by spar caps 124. An optional root buildup 126 provides additional structural support to the root portion 102 and in this embodiment extends completely around a section of the hybrid blade 100. A trailing edge reinforcement 128 is also provided. Aft panels 130 and a leading edge panel 132 assist in transferring loads to the box beam spar assembly 120. An outer surface 134 defines the airfoil shape. It is contemplated that the outer surface 134 may be defined, at least in part, by one or more of the root buildup 126, leading edge panel 132, and aft panels 130.

Although the box beam spar assembly 120 in FIG. 2 has two shear webs 122, the box beam structure may alternatively have more than two shear webs 122. In some applications, for example, it will be advantageous to include three or more shear webs 122 for at least part of the length of the box beam spar assembly 120. It will also be appreciated that the different elements shown in FIG. 2 are not necessarily separate or separable elements.

The shape of the hybrid turbine blade 100 is significantly different from conventional state-of-the-art wind turbine blades. As a result, existing blade design methods are not optimal for designing the hybrid turbine blade 100. A new method for designing multicomponent blades such as the hybrid turbine blade 100 is disclosed herein.

In particular, a new "inside-out" approach to blade design is disclosed that facilitates, for example, quickly exploring a broad design space for the hybrid turbine blade 100. With the "inside-out" design method disclosed herein, a blade spar structure 120 is first designed based on expected design loads, and then suitable airfoil profiles are selected and fitted over the spar structure. A method for designing a spar structure for turbine blades will now be described with reference to an exemplary box beam spar assembly 120 shown in FIG. 3.

FIG. 3 illustrates diagrammatically the box beam spar assembly 120 for the hybrid turbine blade 100. The spar assembly 120 includes a root portion 142 that may be configured to attach to the hub of a wind power turbine (not shown) in a conventional manner, an inboard first joint portion 143, a biplane portion 144, a midboard second joint portion 150, and a monoplane portion 152. Although the box beam spar assembly 120 is illustrated as a unitary construction, it is contemplated, as discussed below, that the spar assembly 120 may be constructed in several segments and assembled. For example, in one segmented embodiment, the root portion 142, one side of the biplane portion 144, and the monoplane portion 152 are formed as a unitary first segment, and the other half of the biplane portion 144 is formed separately and joined to the first segment. In other embodiments disclosed below, the spar assembly 120 is formed in four segments that are connected to form the spar assembly 120.

For design purposes, it is convenient to conceptually split the three-dimensional structure of the spar assembly 120 into two parts: a reference diagram comprising one-dimensional components, and a series of two-dimensional cross-sections. This is convenient because the hybrid blade 100, and therefore the spar assembly 120, is much larger in the span-wise direction than in the other two dimensions (i.e., in the cross-sectional plane, X2-X3).

FIG. 4A illustrates a reference diagram 140' for the spar assembly 120 comprising one-dimensional lines identifying five span-wise regions: (i) the root region 142' represented by line segment AB, (ii) the bifurcated first joint region 143' represented by curved line segments BC and BG, (iii) the two-part biplane region 144' represented by line segments CD and GH, (iv) the second joint region 150' represented by curved line segments DE and HE, and (v) the outboard monoplane region 152' represented by line segment EF. The three regions between B and E in FIG. 4A are sometimes collectively referred to as the inboard biplane region 154'.

Figure 4B:
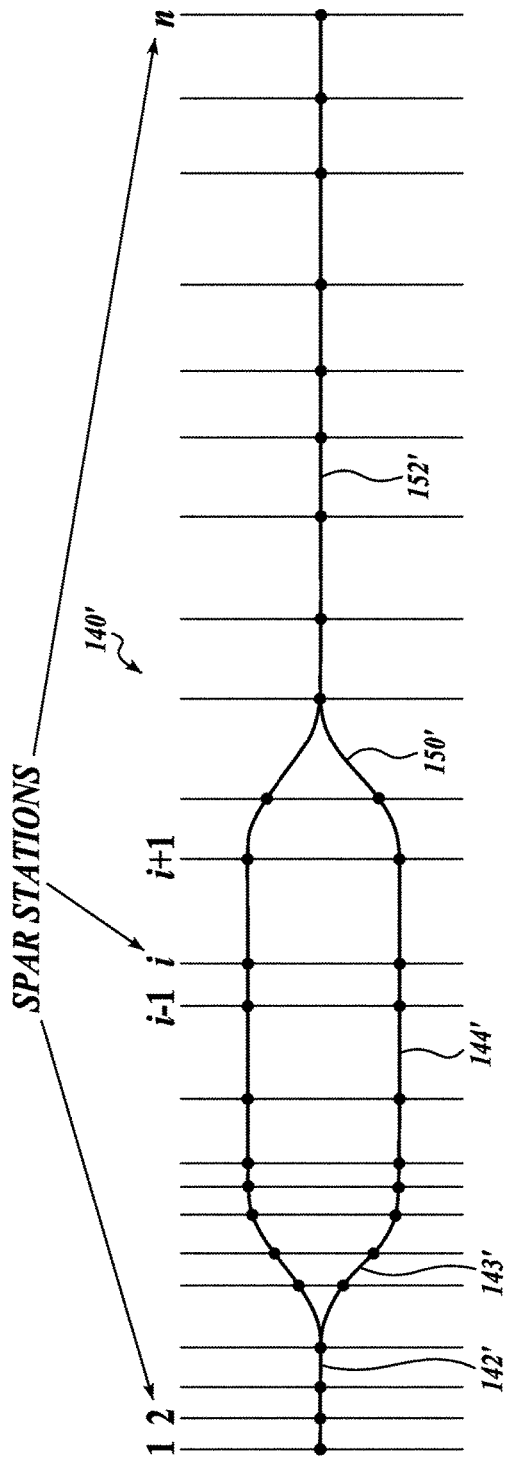
FIG. 4B shows the one-dimensional reference diagram with a plurality of spar stations shown.

FIG. 4B shows the reference diagram 140' discretized into a series of spaced locations referred to herein as a spar station(i), which are indicated by vertical lines and numbered from i=1 to n. To specify a particular design for the spar assembly 120, a two-dimensional box beam cross section is specified for each spar station(i) on the reference diagram 140', with the centroid of the specified cross section positioned on the corresponding line of the reference diagram 140' (two cross-sections are defined for spar stations(i) intersecting the reference diagram 140' in two locations). An interpolation or smoothing method between the spar stations (i) is then employed to define the three-dimensional geometry of the spar assembly 120.

Figure 5:
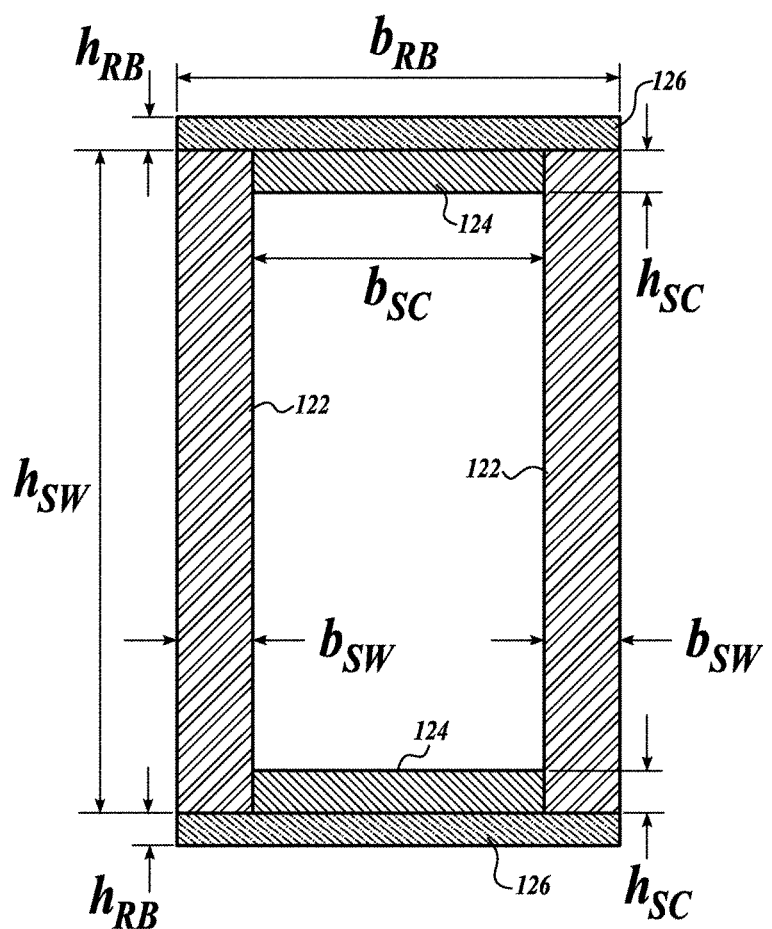
FIG. 5 illustrates schematically a box beam section including an optional root buildup, with nomenclature identifying particular design parameters of the box beam structure.

In the current embodiment, the two-dimensional box beam cross sections include spar caps 124, shear webs 122, and in some cases root buildup portions 126. A representative and simplified cross-section is illustrated in FIG. 5 (not to scale) with nomenclature for cross-section design parameters.

The spar caps 124 are located near the top and bottom of the cross-section. Each spar cap 124 has a height $h_{SC}$ and a width or base $b_{SC}$. The spar caps 124 in a current embodiment are constructed with uniaxial FRP laminates.

The shear webs 122 are located on the left and right of the cross-section, and engage the spar caps 124 to define the box shape at the spar location. Each shear web 122 has a height $h_{SW}$ and a base $b_{SW}$. The shear webs 122 in a current embodiment are constructed with a foam core sandwiched between two biaxial FRP laminates.

The root buildup portions 126 engage the box structure defined by the shear webs 122 and spar caps 124. Each root buildup portion 126 has a height $h_{RB}$ and a base $b_{RB}$. The root buildup portions 126 in a current embodiment are constructed with triaxial FRP laminates. As the name implies, the root buildup portions 126 are typically only present in cross-sections that are positioned in or near the root portion 142 of the spar assembly 120 (e.g., in the root portion 142, the first joint portion 143, and/or an inboard portion of the biplane portion 144), although they may be included along the entire span of the blade. Corresponding dimensions on different elements do not necessarily have the same dimension. For example, $h_{SC}$ of the lower spar cap 124 may be different from $h_{SC}$ for the upper spar cap 124.

The spar assembly 120 is the primary structural element for supporting the loads on the hybrid turbine blade 100. In addition to the aerodynamic loading, the root portion 142 of the spar assembly 120 must be strong enough to allow the wind turbine's onboard controller to pitch the hybrid turbine blade 100 at the root portion 102 and control the blade loads. Preferably, the root portion 142 is kept relatively short in order to maximize the structural benefits of the inboard biplane region 154'. In a currently preferred embodiment, the length of the root portion 142 is between one and five percent of the blade span.

In an exemplary embodiment of the hybrid turbine rotor 100, the length of the biplane portion 104 is about half of the blade's entire span (root to tip), to minimize the tip deflection. For example, in the current embodiment, the inboard biplane region (i.e., the portion including the first joint 103, the biplane portion 104, and the second joint 110) is between 40% and 60% of the span of the wind turbine blade.

To maximize the bending moment of inertia for the biplane cross-sections in the inboard biplane region, in general it is beneficial to provide a large gap 107 between the upper and lower members 106, 108 in the biplane portion 104. In a current embodiment, the ratio of the maximum height of the gap 107 to the chord of one or both of the upper and lower airfoil sections 106, 108 is between 0.8 and 1.2.

It is also contemplated that the airfoil sections 106, 108 may be staggered, i.e., the leading edge of one airfoil positioned forward of the leading edge of the other airfoil. This stagger can improve the aerodynamic stall characteristics of the biplane cross-section. However, the stagger-to-chord ratio should be kept small (no more than one quarter or one half) because a staggered biplane cross-section will incline the principal axes of the structure. The blade will tend to bend about its principal axes, and lessen the structural advantage of the gap between the upper and lower elements.

The spar assembly 120 is preferably formed primarily from a composite materials, for example, an FRP. As mentioned above, the spar assembly 120 is the primary load-carrying component of the hybrid turbine blade 100. Although an attractive application for the present invention is in the field of large wind turbine blades (e.g., 100 meter length or greater), it is contemplated the disclosed construction and design method may be industrially applied to the development, manufacture, and use of other fluid turbine blades, airplane wings, pumps, and propellers.

An exemplary embodiment will now be described, with reference to the tables below. Different cross-section geometries are created for each spar station(i). The individual cross-section geometries may also have differing angular orientations. For example, a particular rotation of the individual cross-sections may be specified to define a twist in the spar assembly 120.

The component parameters and orientations are specified for each cross-section at the spar stations(i). The monoplane cross-sections (e.g., at the root portion 142 and the monoplane portion 152) require only one specification, whereas the biplane portions (e.g., the first joint portion 143, biplane portion 144, and second joint portion 150) require two specifications.

When the cross-sections at the spar stations(i) are specified, an interpolation method, for example, cubic splines, non-uniform rational B-splines ("NURBS"), or the like, may be used between the spar stations(i) to complete the design of the box beam spar assembly 120.

In this example, the hybrid spar assembly has a span of 91.9 meters, and is designed to be used with a 100-meter long biplane blade. The spar assembly 120 is slightly shorter than the blade because the spar starts slightly outboard of the blade root and ends slightly inboard of the blade tip. Blades of this length are expected to be used on 10-15 megawatt turbines.

Table 1 lists the coordinates (X1, X2, X3) of each spar station(i) on the reference diagram 140' used to make the biplane spar. For example, the root region 142' is located between spar stations 1 and 2. The bifurcated root transition region 143' is located between spar stations 2 and 4. The two-part biplane region 144' is located between spar stations 4 and 14. The second joint region 150' is located between spar stations 14 and 16. The inboard biplane region 154' includes the root transition region 143', the biplane region 144', and the joint transition region 150', each of which require defining two spar cross sections. Therefore, in this example two X3-coordinates are given for spar stations in the inboard biplane region: one for the upper reference line, and the other for the lower reference line. Finally, in this example the outboard monoplane region is located between spar stations 16 and 24.

Table 1 also lists the curvatures (K1, K2, K3) for the one-dimensional reference lines used to define the example hybrid spar assembly 120. The curvature K1 corresponds to a twist angle in the reference line about the X1-axis. Similarly, K2 and K3 correspond to curvatures about the X2- and X3-axes. As will be apparent from Table 1, in this example the spar assembly 120 has zero curvature. The hybrid spar assembly 120 is untwisted along its span; hence, K1 is zero everywhere. The biplane airfoils are not staggered; hence, K3 (and X2) are also zero everywhere. The local curvature K2 of the reference lines in the root transition and joint transition regions is zero at each of the spar stations(i) listed; however, between these spar stations, it is clearly nonzero as the reference line bends along these transition regions.

TABLE 1

One-dimensional reference lines definitions for spar stations.

| spar station | spar frac (%) | coordinates (m) | | | | curvatures (rad/m) | | |
|---|---|---|---|---|---|---|---|---|
| | | X1 | X2 | | X3 | K1 | K2 | K3 |
| 1 | 0.0% | 0.0 | 0.0 | | 0.000 | 0.0 | 0.0 | 0.0 |
| 2 | 0.2% | 0.2 | 0.0 | | 0.000 | 0.0 | 0.0 | 0.0 |
| 3 | 2.5% | 2.3 | 0.0 | +/- | 1.907 | 0.0 | 0.0 | 0.0 |
| 4 | 4.8% | 4.4 | 0.0 | +/- | 3.814 | 0.0 | 0.0 | 0.0 |
| 5 | 7.1% | 6.5 | 0.0 | +/- | 3.814 | 0.0 | 0.0 | 0.0 |
| 6 | 9.8% | 9.0 | 0.0 | +/- | 3.814 | 0.0 | 0.0 | 0.0 |
| 7 | 13.3% | 12.2 | 0.0 | +/- | 3.814 | 0.0 | 0.0 | 0.0 |
| 8 | 15.1% | 13.9 | 0.0 | +/- | 3.814 | 0.0 | 0.0 | 0.0 |
| 9 | 16.9% | 15.5 | 0.0 | +/- | 3.814 | 0.0 | 0.0 | 0.0 |
| 10 | 18.6% | 17.1 | 0.0 | +/- | 3.814 | 0.0 | 0.0 | 0.0 |
| 11 | 21.5% | 19.8 | 0.0 | +/- | 3.814 | 0.0 | 0.0 | 0.0 |
| 12 | 24.5% | 22.5 | 0.0 | +/- | 3.814 | 0.0 | 0.0 | 0.0 |
| 13 | 27.4% | 25.2 | 0.0 | +/- | 3.814 | 0.0 | 0.0 | 0.0 |
| 14 | 36.3% | 33.4 | 0.0 | +/- | 3.814 | 0.0 | 0.0 | 0.0 |
| 15 | 45.2% | 41.5 | 0.0 | +/- | 1.907 | 0.0 | 0.0 | 0.0 |
| 16 | 54.0% | 49.6 | 0.0 | | 0.000 | 0.0 | 0.0 | 0.0 |
| 17 | 62.9% | 57.8 | 0.0 | | 0.000 | 0.0 | 0.0 | 0.0 |
| 18 | 70.0% | 64.3 | 0.0 | | 0.000 | 0.0 | 0.0 | 0.0 |
| 19 | 71.7% | 65.9 | 0.0 | | 0.000 | 0.0 | 0.0 | 0.0 |
| 20 | 77.0% | 70.8 | 0.0 | | 0.000 | 0.0 | 0.0 | 0.0 |
| 21 | 80.5% | 74.0 | 0.0 | | 0.000 | 0.0 | 0.0 | 0.0 |
| 22 | 89.4% | 82.2 | 0.0 | | 0.000 | 0.0 | 0.0 | 0.0 |
| 23 | 94.7% | 87.0 | 0.0 | | 0.000 | 0.0 | 0.0 | 0.0 |
| 24 | 100.0% | 91.9 | 0.0 | | 0.000 | 0.0 | 0.0 | 0.0 |

Table 2 lists illustrative dimensions of the two-dimensional cross-section geometries at each spar station. Two dimensions (base and height) are given for each structural component (spar cap, shear web, and root buildup). All three structural components are present near the root, between spar stations 1 and 6. However, the root buildup laminate ends at spar station 6; only spar caps and shear webs are present between spar stations 7 and 24.

TABLE 2

Two-Dimensional geometries at spar stations.

| spar station | spar frac (%) | spar cap | | Shear web | | Root buildup | |
|---|---|---|---|---|---|---|---|
| | | $b_{SC}$ (m) | $h_{SC}$ (m) | $b_{SW}$ (m) | $h_{SW}$ (m) | $b_{RB}$ (m) | $h_{RB}$ (m) |
| 1 | 0.0% | 1.50 | 0.0130 | 0.0860 | 5.2660 | 1.6720 | 0.0630 |
| 2 | 0.2% | 1.50 | 0.0130 | 0.0860 | 5.2650 | 1.6720 | 0.0550 |
| 3 | 2.5% | 1.50 | 0.0100 | 0.0860 | 2.5045 | 1.6720 | 0.0200 |
| 4 | 4.8% | 1.50 | 0.0150 | 0.0860 | 2.3705 | 1.6720 | 0.0125 |
| 5 | 7.1% | 1.50 | 0.0255 | 0.0860 | 2.2125 | 1.6720 | 0.0075 |
| 6 | 9.8% | 1.50 | 0.0340 | 0.0860 | 2.0455 | 1.6720 | 0.0025 |
| 7 | 13.3% | 1.50 | 0.0470 | 0.0860 | 1.8400 | 0.0 | 0.0 |
| 8 | 15.1% | 1.50 | 0.0555 | 0.0860 | 1.7400 | 0.0 | 0.0 |
| 9 | 16.9% | 1.50 | 0.0555 | 0.0860 | 1.6425 | 0.0 | 0.0 |
| 10 | 18.6% | 1.50 | 0.0680 | 0.0860 | 1.5445 | 0.0 | 0.0 |
| 11 | 21.5% | 1.50 | 0.1360 | 0.0860 | 1.4410 | 0.0 | 0.0 |
| 12 | 24.5% | 1.50 | 0.1360 | 0.0860 | 1.3480 | 0.0 | 0.0 |
| 13 | 27.4% | 1.50 | 0.1280 | 0.0860 | 1.2490 | 0.0 | 0.0 |
| 14 | 36.3% | 1.50 | 0.1190 | 0.0860 | 1.0385 | 0.0 | 0.0 |
| 15 | 45.2% | 1.50 | 0.1110 | 0.0860 | 0.8360 | 0.0 | 0.0 |
| 16 | 54.0% | 1.50 | 0.1020 | 0.0860 | 1.3600 | 0.0 | 0.0 |
| 17 | 62.9% | 1.50 | 0.0850 | 0.0860 | 1.1380 | 0.0 | 0.0 |
| 18 | 70.0% | 1.50 | 0.0680 | 0.0860 | 0.9540 | 0.0 | 0.0 |
| 19 | 71.7% | 1.50 | 0.0640 | 0.0860 | 0.9100 | 0.0 | 0.0 |
| 20 | 77.0% | 1.50 | 0.0470 | 0.0860 | 0.8320 | 0.0 | 0.0 |
| 21 | 80.5% | 1.50 | 0.0340 | 0.0860 | 0.7960 | 0.0 | 0.0 |

TABLE 2-continued

Two-Dimensional geometries at spar stations.

| spar station | spar frac (%) | b$_{SC}$ (m) | spar cap h$_{SC}$ (m) | b$_{SW}$ (m) | Shear web h$_{SW}$ (m) | b$_{RB}$ (m) | Root buildup h$_{RB}$ (m) |
|---|---|---|---|---|---|---|---|
| 22 | 89.4% | 1.50 | 0.0170 | 0.0860 | 0.7070 | 0.0 | 0.0 |
| 23 | 94.7% | 1.50 | 0.0090 | 0.0860 | 0.6510 | 0.0 | 0.0 |
| 24 | 100.0% | 1.50 | 0.0050 | 0.0860 | 0.5080 | 0.0 | 0.0 |

In this exemplary embodiment, the dimensions b$_{SC}$ and b$_{SW}$ are constant for all spar stations. Therefore, in this embodiment the spar assembly 120 will have straight shear webs 122, which are separated by a constant distance, and the spar assembly 120 has a constant-width construction.

As discussed above, in this exemplary embodiment the shear webs 122 have a sandwich construction comprising a foam core placed between two biaxial FRP laminates. For all spar stations, the dimension b$_{SW, foam}$ is 0.080 meters, and the dimension b$_{SW, biax}$ is 0.003 meters.

The material properties for each of the FRP laminates may then be specified. For example, a uniaxial laminate for the spar caps, a biaxial laminate for the shear webs, and a triaxial laminate for the root buildups.

In a current embodiment, the uniaxial laminate is made of 2 plies, each of which has their fibers oriented at 0-degrees; the biaxial laminate is made of 8 plies, each alternating between +45-degree fibers and −45-degree fibers; and the triaxial laminate is made of 6 plies; the first 4 plies alternate between +45 and −45-degree fibers, the last 2 plies both have 0-degree fibers. Tables 1 and 2, with the materials and layups, give a complete definition for the composite lay-up of the example spar assembly 120.

It will be appreciated by persons of skill in the art that designing suitable dimensional requirements for the spar assembly 120 can be accomplished using well-known methods. For example, in an iterative method, a preliminary design for the spar assembly 120 is developed. An initial estimate of the forces that will be acting on the spar assembly may be provided or calculated. The structural requirements for the preliminary spar assembly may then be calculated. Particular parameters may be studied systematically, for example, the gap width between the biplane elements and/or the relative lengths of the root, biplane, and monoplane segments.

First Blade Embodiment

Figure 6C:
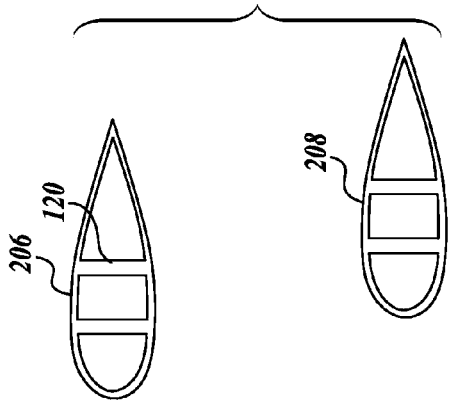
FIGS. 6C-6I show cross-sections of the hybrid wind turbine blade shown in FIG. 6A.
Figure 6D:
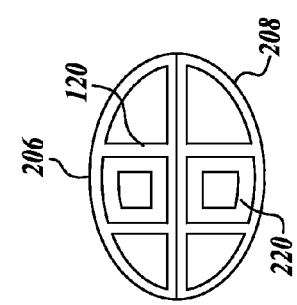
Figure 6E:
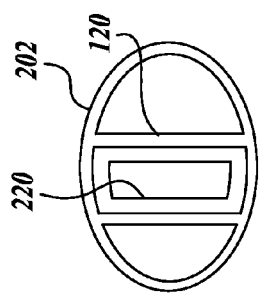
Figure 6F:
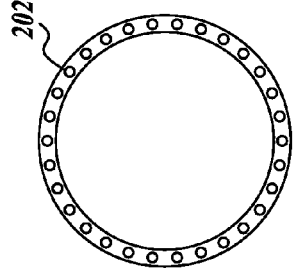
Figure 6G:
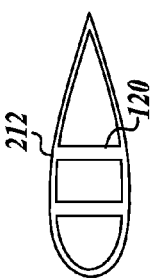
Figure 6H:
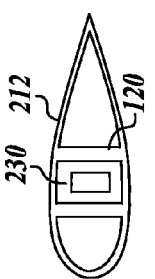
Figure 6I:
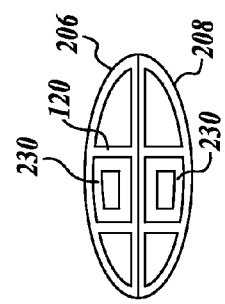

An exemplary embodiment of a hybrid turbine blade 201, comprising an aerodynamic shell fixed to or co-formed with the box beam spar assembly 120 (FIG. 3), wherein the spar assembly 120 comprises four separate segments, is shown in FIGS. 6A-6I. FIG. 6A shows the assembled hybrid turbine blade 201, FIG. 6B is an exploded view of the hybrid turbine blade 201, and FIGS. 6C-6I show the cross-sections indicated in FIG. 6A (details of spar assembly 120 cross-sections not shown, for clarity). The turbine blade 201 is constructed in four airfoil segments: (i) a short root segment 202 that is configured to be secured to the turbine rotor, (ii) a first biplane segment 206, (iii) a second biplane segment 208, and (iv) a monoplane segment 212.

The root segment 202 is joined to an inboard end of the first and second biplane segments 206, 208 with a first Y-shaped insert 220. The first Y-shaped insert 220 has a first end 222 that fixedly engages the root portion 142 of the box beam spar assembly 120, and a bifurcated second end 224 that fixedly engages the first joint portion 143 of the spar assembly 120. The first Y-shaped insert 220 may be formed from any suitable material, and in a current embodiment comprises a tubular FRP structure. The first Y-shaped insert 220 is shaped to position the first and second biplane segments 206, 208 in a desired position and orientation relative to the root segment 202.

Similarly, the monoplane segment 212 is joined to the outboard end of the first and second biplane segments 206, 208 with a second Y-shaped insert 230 oriented generally opposite the first Y-shaped insert 220. The second Y-shaped insert 230 has a first end 232 that engages the monoplane portion 152 of the box beam assembly 120, and a second end 234 that engages the outboard end of the second joint portion 150 of the box beam assembly 120. The first and second inserts 220, 230 are sized such that the root segment 202 abuts the first and second biplane segments 206, 208, and the first and second biplane segments 206, 208 abut the monoplane segment 212. Root and midboard wedges 214 are optionally positioned between the inboard and outboard ends of the biplane segments 206, 208 to reduce stress concentrations.

FIGS. 6C-6I illustrate the corresponding cross sections indicated in FIG. 6A. The segments 202, 206, 208, and 212 may be fixed to the Y-shaped inserts 220, 230 in any suitable manner, for example, by friction fitting, latches, bonding, fasteners such as bolts or rivets, sleeves, or combinations thereof.

It will be appreciated that the hybrid turbine blade 201 comprises multiple pieces that are joined with sufficient structural strength to endure a desirable blade lifetime. For example, the hybrid turbine blade 201 may be transported unassembled to a construction site, and assembled on site. Additionally, it is contemplated that the hybrid turbine blade may further include a small inboard root adaptor segment configured to facilitate mating the blade with the hub. This is especially important for retrofits, as well as to use existing blade pitch control mechanisms.

Second Hybrid Blade Embodiments

A second embodiment of a hybrid turbine blade 241 in accordance with the present invention is shown in FIGS. 7A-7B. In this embodiment, the root segment 202 is joined to the inboard ends of the first and second biplane segments 206, 208 through a first plate 242 that is sized to smoothly transition between the outboard end of the root segment 202 and the inboard ends of the first and second inboard segments 206, 208.

The monoplane segment 212 is joined to the outboard ends of the biplane segments 206, 208 through a second plate 244 that is configured to smoothly transition between the monoplane segment 212 and the biplane segments 206, 208. Other aspects of the hybrid turbine blade 241 may be similar to the hybrid turbine blade 201 shown in FIG. 6A. One or both of the plates 242, 244 may include shaped surface recesses (not shown) that are sized to receive the ends of the corresponding blade segments.

The first and second plates may be formed from any suitable material. In a currently preferred embodiment, the first and second plates 242, 244 are formed primarily of an FRP. The segments 202, 206, 208, 212 may be fixed to the respective plates 242, 244 in a conventional manner, for example, with latches, bonding, fasteners such as bolts or rivets, sleeves, or combinations thereof. Root and midboard wedges 214 are optionally positioned between the inboard and outboard ends of the biplane segments 206, 208 to reduce stress concentrations.

In an alternative embodiment the joining plates 242, 244 are sized to extend outwardly beyond the aerodynamic surface of the blade segments, for example, to alter the aerodynamic performance of the hybrid blade 221 by altering spanwise air flow along the blade.

Third Hybrid Blade

Another embodiment of a hybrid turbine blade 251 in accordance with the present invention is illustrated in FIGS. 8A-8I. Similar to the hybrid turbine blade 241 shown in FIGS. 6A-6I, in this embodiment the turbine blade 251 includes a root segment 202', first and second biplane segments 206', 208', and an outboard monoplane segment 212'.

As most clearly seen in FIG. 8D, in this embodiment the box beam assembly 120' further comprises a third shear web 123 along a portion of its length. A first set of angle brackets 170 are fixed to the third shear web 123. A second set of angle brackets 171 are fixed to the outer shear webs 122. Additionally, channel members 180 are fabricated into the spar caps 124' and/or root buildup.

As seen most clearly in FIG. 8E, the box beam assembly 120' in the first and second biplane segments 206', 208' include an intermediate third shear web 123 along a portion of their length. A first set of angle brackets 172 are fixed to the third shear web 123. A second set of angle brackets 173 are fixed to the outer shear webs 122. The first set of angle brackets 170 in the root segment 202' and the first set of angle brackets 172 in the biplane segments 206', 208' extend axially from the respective sections, and are positioned such that they abut each other when the blade 251 is assembled, and the angle brackets 170, 172 are bolted or otherwise joined together (or otherwise fixed to each other) in the assembled blade. The angle brackets 171, 173 are similarly constructed to abut and be joined together. Channel members 180 are also fabricated into the spar caps 124' and/or root buildup 126 in the biplane segments 206', 208'.

As shown in FIG. 8B, a plurality of channel inserts 205' are configured to engage the channel members 180, to join the root segment 202' with the biplane segments 206', 208'. The channel inserts 205' and channel members 180 preferably include locking means, for example, threaded portions or the like, for securing the blade segments 202' and 206', 208'. Therefore, in this embodiment, the shear webs 122, 123 are structurally joined with the angle brackets 170, 171, 172, 173, and the spar caps 124' are structurally joined with the channel inserts 205'. Similar connection means are provided for joining the monoplane segment 212' with the biplane segments 206', 208'. Aerodynamic cowlings 203', 204' overlie the channel joints. Root and midboard wedges 214 are optionally positioned between the inboard and outboard ends of the biplane segments 206', 208' to reduce stress concentrations.

Although the segmented blades disclosed above are currently preferred, it is contemplated that the wind turbine blade with the internal box beam spar assembly 120 may be constructed without segmenting the blade, as a unitary structure.

In another embodiment, a first segment may be constructed comprising the root, one of the biplane sections, and the monoplane section, and wherein optionally the one biplane section is offset from the root and monoplane section. A second biplane section is joined to the first segment to form a hybrid blade. For example, a single spar may extend along the length of the blade, with accommodation incorporated to structurally join the second biplane airfoil to the spar.

It will also be apparent to persons of skill in the art that the inboard region may be modified to include more than two blade segments (for example, "triplane" blades or "quadplane" blades).

While illustrative embodiments have been illustrated and described, it will be appreciated that various changes can be made therein without departing from the present invention.

The embodiments of the invention in which an exclusive property or privilege is claimed are defined as follows:

1. A wind turbine blade comprising:
   a root segment, a biplane segment extending from the root segment, and a monoplane segment extending from the biplane segment, wherein an elongate box spar assembly extends substantially through the root segment, entirely through the biplane segment, and substantially through the monoplane segment,
   wherein the box spar assembly comprises:
   (i) a root;
   (ii) an inboard joint extending from the root, the inboard joint comprising a first leg and a second leg;
   (iii) a biplane portion comprising an upper member extending from the first leg of the inboard joint and a lower member extending from the second leg of the inboard joint;
   (iv) a midboard joint comprising a first leg that extends from the upper member and a second leg that extends from the lower member; and
   (v) a monoplane portion that extends from the midboard joint;
   the wind turbine blade further comprising an external assembly fixed to the box spar assembly, wherein the external assembly defines an outer surface of the wind turbine blade;
   wherein the root of the box spar assembly comprises two spar caps having embedded channel members and two shear webs, and the upper and lower members of the biplane portion of the box spar assembly each comprise two spar caps having embedded channel members and two shear webs, and further comprising channel connectors that join the embedded channel members in the root spar caps with the embedded channel members in the upper and lower members of the box spar assembly.

2. The wind turbine blade of claim 1, wherein the inboard joint joins the root of the box spar assembly to the biplane portion of the box spar assembly.

3. The wind turbine blade of claim 2, wherein the midboard joint joins the biplane portion of the box spar assembly to the monoplane portion of the box spar assembly.

4. The wind turbine blade of claim 1, wherein the inboard joint comprises a first Y-shaped inboard connector having a first end that engages the root of the box spar assembly, a second end that engages the upper member of the box spar assembly, and a third end that engages the lower member of the box spar assembly.

5. The wind turbine blade of claim 4, wherein the midboard joint comprises a second Y-shaped connector having a first end that engages the monoplane portion of the box spar assembly, a second end that engages the upper member of the box spar assembly, and a third end that engages the lower member of the box spar assembly.

6. The wind turbine blade of claim 1, wherein the length of the intermediate biplane segment is between 40% and 60% of the entire length of the wind turbine blade.

7. The wind turbine blade of claim 1, the two shear webs of the root of the box spar assembly comprising two biaxial fiber-reinforced plastic laminates with a foam core.

8. The wind turbine blade of claim 7, the two spar caps of the root of the box spar assembly comprising uniaxial fiber-reinforced plastic.

9. The wind turbine blade of claim 8, wherein the root of the box spar assembly further comprises a root buildup formed from a triaxial fiber-reinforced plastic.

10. The wind turbine blade of claim 1, wherein the box spar assembly comprises a unitary fiber-reinforced plastic laminate structure fabricated as a single component.

11. The wind turbine blade of claim 1, wherein the root of the box spar assembly further comprises a third shear web with a first angle bracket fixed thereto, and wherein the upper member and lower member of the biplane portion of the box spar assembly further comprise a third shear web with a second angle bracket fixed thereto, and wherein the first angled bracket is configured to be bolted to the second angle brackets.

12. The wind turbine blade of claim 11, further comprising two third angle brackets fixed to the two shear webs root of the box spar assembly, and two fourth angle brackets fixed to the two shear webs in the biplane portion of the box spar assembly, wherein the third angle brackets are configured to be bolted to the fourth angle brackets.

* * * * *